United States Patent [19]

Palicot

[11] Patent Number: 5,159,609
[45] Date of Patent: Oct. 27, 1992

[54] DATA RECEIVING DEVICE WITH DELAYED EQUALIZATION AND RETROACTIVE TIME-PULSE RECOVERY

[75] Inventor: Jacques Palicot, Rennes, France

[73] Assignee: Etat Francais (CNET) and Telediffusion de France, France

[21] Appl. No.: 554,608

[22] Filed: Jul. 18, 1990

[30] Foreign Application Priority Data

Jul. 18, 1989 [FR] France .................. 89 09956

[51] Int. Cl.$^5$ .................................. H03H 7/40
[52] U.S. Cl. .................. 375/14; 364/724.2; 333/18
[58] Field of Search ............ 375/13, 14, 15, 96, 375/106; 364/724.2; 333/18; 358/905

[56] References Cited

U.S. PATENT DOCUMENTS

| | | | |
|---|---|---|---|
| 3,978,407 | 8/1976 | Forney et al. | 375/15 |
| 4,024,342 | 5/1977 | Croisier et al. | 375/15 |
| 4,061,978 | 12/1977 | Motley et al. | 375/14 |
| 4,550,415 | 10/1985 | Debus et al. | 375/14 |
| 4,673,979 | 6/1987 | Kobo et al. | 375/11 |
| 4,696,015 | 9/1987 | Palicot et al. | 375/14 |
| 4,860,310 | 8/1989 | Lamnabhi et al. | 375/18 |
| 4,872,184 | 10/1989 | Yamaguchi et al. | 375/14 |

FOREIGN PATENT DOCUMENTS 2627340  8/1989  France .
2646744 11/1990  France .

Primary Examiner—Benedict V. Safourek
Assistant Examiner—Young Tse
Attorney, Agent, or Firm—Locke Reynolds

[57] ABSTRACT

The field of the invention is that of data processing modules placed in a receiver of a data transmission or emission network, and charged with the equalizing and time-pulse recovery of the received data, in order to furnish to the next elements of the chain of the receiver a clear signal with a clean and resynchronized clock phase.

The objective is to provide a device extending the limits of restoring the service in the case of strong disturbances of the channel.

According to the invention, the device comprises in particular a timepulse recovery circuit (42) arranged in retroactive relooping at the output of the digital equalizer (56) in order to control the said ADC (41) feeding the equalizer, means to stabilize the calculation of filtering coefficients, comprising means to control the interruption of the calculation of new filtering coefficients, according to a criterion of crossing of a threshold of satisfactory equalizing, and means (57) to control the resetting of the filtering coefficients, according to a criterion of crossing of a threshold of maximum operating deviation of the filtering module.

1 Claim, 4 Drawing Sheets

CASE #1

CASE #2

CASE #3

DATA RECEIVING DEVICE WITH DELAYED EQUALIZATION AND RETROACTIVE TIME-PULSE RECOVERY

BACKGROUND OF THE INVENTION

1. Field of the Invention

The field of the invention is that of data processing modules placed in a receiver of a data transmission or emission network, and designed to equalize and recover the time-pulse of the received data, in order to furnish to the following elements of the chain of the receiver a clear signal with a clean and resynchronized clock phase.

The invention applies to any data signal as long as it is received or returned in base band.

In a specific, evidently not limitative, application of the invention, the equalizing device with time-pulse recovery can process signals formed with a multiplexing of data and analog information, such as the television signal transmitted according to the X-MAC standards, and especially D2-MAC. In this case, the device of the invention is transparent for the analog component of the multiplexed signal.

It is known that the transmission or the emission of data on all types of media generates linear and non-linear disturbances. The result is a phenomenon of data overlap, known as intersymbol interference.

Another consequence, not covered in as much detail in the literature but of equal importance, is the difficulty in correctly recovering the time-pulse and therefore the clock phase associated with the data.

It is clear that the time-pulse recovery operation is fundamental for the subsequent processing operations of the signal in the receiver.

Thus, in a received D2-MAC signal, the time-pulse recovery governs a large number of functions of the receiver, such as the fenestration (windowing) of the bursts of data in the multiplex, the digital synchronization of the data signal, as well as the Automatic Gain Control, or also the recovery of the continuous component. In other words, in the absence of time-pulse recovery, no service can be rendered at the reception.

2. Description of the Prior Art

Time-pulse recovery devices are known, such as the one shown in FIG. 1. In these devices, specially adapted to D2-MAC receivers, an analog to digital converter ADC 11 digitizes the received signal 10 under the control of a clock recovery module 12. This module 12 operates for example from the analog signal 10, on a principle of detection of the passages through the zero thresholds of the signal (for. ex.: 0), so as to produce a line at 10.125 MHz corresponding to the frequency of the transmitted duobinary signal.

The digitized signal available at the ADC 11 output is then directed to a time base 13 which provides resynchronization of the received signal on the frame synchro signal 14, for example by means of a shift register cooperating with a comparator and an image stored in the frame synchro. With the time base 13, it is therefore in particular possible to extract the digital bursts from the D2-MAC, for decoding the sound and the data, as well as the other synchro data such as line, frame and/or packet.

Such a circuit, however, has two drawbacks:

first, there may be problems of clock phase synchronization, in case the transmission channel of the signal 10 is strongly disturbed;

on the other hand, the echo phenomenon induces in the transmission channel distortions of its transfer function, which lead in particular to intersymbol interference.

The idea occurred of combating the intersymbol interference by using correctors of the type of a detection module 15 according to the greatest probability using the Viterbi algorithm. Indeed this type of correcting structure makes it generally possible to obtain a gain of 3 dB on the signal to noise ratio, when the processed signal is a clean signal presenting an open eye diagram. In the opposite case, it is found in practice that the efficacy of the Viterbi decoder remains limited in case of disturbance.

An objective of the invention is to provide an equalizing system enabling in particular the received signal to be corrected early, at the reception, so that the limits of "falling out of synchronism" of the receiver are extended. The equalizing device of the invention is compatible with Viterbi decoding systems, but can also be used in the absence of this type of decoder.

The equalizing operation, in a known manner, aims to process the received signal in an equalizing module whose transfer function is closest to the inverse of that of the transmission channel at all times.

Linear distortion correcting devices are known, particularly in the form of a self-adapting equalizer adapting itself to the data signal as described in U.S. Pat. No. 4,696,015. According to that document, the equalizer consists of using an algorithm minimizing the average quadratic error in the received signal, by adjusting filtering coefficients of a digital filter equalizing the received signal. A great number of algorithms can be considered, like those presented in the thesis "design and embodiment of an echo corrector adapted to the emission of data DIDON" (defended on Dec. 9, 1983 before the University of Rennes I by Jacques PALICOT).

From the French patent 88 01641, a self-adapting equalizer is also known that is applicable to the X-MAC type signals, and especially to the ND-MAC signals, consisting of introducing a reference signal in the temporal multiplex of analog image signals and of digital sound signals and of characteristic data of the X-MAC signals, so as to use the reference signal to effect an adaptive equalization at the reception. Equalizing is then effected by using an adaptive transverse filter, fed by the samples of the ND-MAC signal, equipped with means of adaptation of its coefficients by comparison between the reference sequence received at the output of the filter and the stored reference sequence.

Two types of circuit are known enabling an equalizing device to be combined with a time-pulse recovery device, as shown in FIGS. 2 and 3.

Depending on the type of circuit, the time-pulse recovery module 12 samples a digital signal 17 or an analog signal 10 depending on whether it is mounted after (FIG. 2) or before (FIG. 3) of the ADC 11. But, in any case, the equalizer 16 is always placed in cascade behind the ADC 11/time-pulse recovery device 12. As a result, the time-pulse recovery 12 is never effected on the equalized data signal, and therefore does not benefit from the reshaping of the data permitted by the equalizer 16. This represents an important limit of the equalizing systems, for when the clock phase established by the time-pulse recovery device is not stable, equalizing cannot operate.

The objective of the invention is also to overcome these disadvantages of the existing systems.

SUMMARY OF THE INVENTION

More specifically, an essential objective of the invention is to extend the limits of the service, at the receiver, by making possible a time-pulse recovery even in case of strong disturbances in the transmission channel.

Another essential objective of the invention is to permit a time-pulse recovery on the equalized received signal, by eliminating the risks of divergence of the circuit.

An additional objective of the invention is to provide an equalizing and time-pulse recovery system that includes a strong function of synchronization of the clock phase of the received signal, according to a method using successive attempts including the possibility of a single or repeated failure.

These objectives, as well as others that will appear later, are reached by means of an equalizing device with time-pulse recovery, designed in particular to equip a receiver of a transmission or emission network of a signal including data, device of the type comprising a digital equalizer fed by a ADC digitizing the received signal cooperating with a time-pulse recovery circuit providing in particular the synchronization of the ADC, the said equalizer comprising a filtering module consisting of a digital filter controlled by a module calculating the filtering coefficients, from data representative of the received signal, and means to stabilize the said calculation of filtering coefficients, and the time-pulse recuperating circuit being arranged in retroactive reloop at the output of the digital equalizer to control the said ADC feeding the equalizer.

This way, the time-pulse recovery can be effected on a clean signal, since it has been equalized beforehand. The presence of means to stabilize the calculation of coefficients enables on the other hand the risks of divergence of the equalizing process to be avoided.

According to another characteristic of the invention, the said data representative of the received signal are supplied by means of elaboration of sequences of simulation of a stable clock phase of the received signal, consisting of the repetition of a digital burst sampled in the received signal.

Advantageously, the said means of elaboration of sequences of simulation comprise means to store the said sampled burst of data, cooperating with means to transmit repeatedly the said stored burst to the said filtering module, and means to cause a new burst of data to be stored, for a new cycle, after the elaboration of new filtering coefficients from the sequence of repetition of the current burst of data.

This way, the device offers two cumulative advantages:
the module of calculation of the filtering coefficients works on a source signal with stable clock phase, which permits optimizing the equalizing operation;
equalizing of the received signal is effected in delayed mode, due to the time of processing, in parallel, the data sampled in the module of calculation of the filtering coefficients; in this manner, the risks of divergence are particularly limited, equalizing a very high frequency signal is made possible, especially in the order of 10 MHz, and temporarily multiplexed signals are easier to process.

In a preferred mode of embodiment of the invention, the digital equalizer is a transverse filter, and can for example operate according to the criterion of the average quadratic error.

According to an important characteristic of the invention, the means to stabilize the calculation of the filtering coefficients comprise means to control the interruption of the calculation of new filtering coefficients, according to a criterion of crossing a satisfactory equalizing threshold. The amount of expression of the interrupt control device belongs advantageously to the group including the average quadratic error, the rate of violation of a duobinary signal, and a threshold value for at least one filtering coefficient controlling the digital filter.

This is a fundamental characteristic, since it makes it possible to avoid the risks of divergence of the relooped process of equalizing with time-pulse recovery, by interrupting the iterative equalizing/time-pulse recovery process whenever a satisfactory correction of the signal is obtained.

In addition, according to another advantageous characteristic of the invention, the said means to stabilize the calculation of filtering coefficients comprise means to control the Resetting of the filtering coefficients, according to a criterion of crossing a threshold of maximum deviation in the operation of the filtering module.

Preferably, the said Resetting criterion belongs to the group including the crossing of a threshold by the sum of the filtering coefficients, and the crossing of a threshold with maximum value by at least one of the said filtering coefficients.

This characteristic of the invention permits implementing a process of synchronizing of the signal, operating by successive trials, with Resetting in case of failure.

In the case of reception of a temporal multiplex of analog and digital signals, the device of the invention comprises advantageously:
a first means of synchronizing a digital train in the received signal;
a second means of fenestration of a digital burst in the received signal, based on the calculation of a time base in a synchronized and equalized digital train, the said device comprising means of selective switching of the said first means of synchronizing or of the second means of fenestration, for the sampling and/or storage control of a digital burst constituting the said data representative of the received signal.

This system of digital burst synchronization and fenestration, in two separate steps, confers to the equalizing/time-pulse recovery device good strength in case of disturbances in the transmission channel.

Also, when the received signal is a multiplexed X-MAC type signal, the said sampled burst is advantageously the burst of the data of a line signal, and/or the said digital filter is a transverse filter operating at twice the frequency of the data.

In general, it is of advantage when the said ADC provides digitizing at a frequency at least double the bit frequency of the received signal.

The invention relates also to a process of equalization and of time-pulse recovery implemented by means of a device consisting of:
sampling, after digitizing of the received signal, a burst of data in the said digitized signal, so as to form a sequence of simulation of a stable clock frequency by repetition of the said sampled burst;

controlling a digital filter processing the said received digitized signal, by means of a module of calculation of filtering coefficients elaborated from the said sequence of simulation, the said control being effected in delayed mode in relation to the sampling of the data burst;

obtaining a new synchronizing reference, from the analysis of the digitized and filtered received signal, by a time-pulse recovery module;

controlling the sampling fenestration of the data bursts and/or the ADC digitizing the received signal of the said new synchronizing reference.

This process comprises essentially at least one of the following stop conditions:

interruption of the calculation of new filtering coefficients, according to a criterion of crossing a satisfactory equalizing threshold;

Resetting of the filtering coefficients, according to a criterion of crossing a maximum deviation of the operation of the filtering module.

BRIEF DESCRIPTION OF THE DRAWINGS

Other characteristics and advantages of the invention will become evident when reading the following description of a preferred, exemplary and nonlimitative, mode of embodiment of the invention, in the case of the reception of a D2-MAC type signal, with reference to the attached drawings in which.

DESCRIPTION OF PREFERRED EMBODIMENTS

The mode of embodiment shown below in detail in FIGS. 5 to 10 corresponds to the implementation of the equalizing/time-pulse recovery device in case of reception of a D2-MAC type signal, i.e. consisting of a multiplex of a burst of sound and duobinary data, and of an analog signal of luminance and chrominance, for each line of a television signal.

Figure 1:
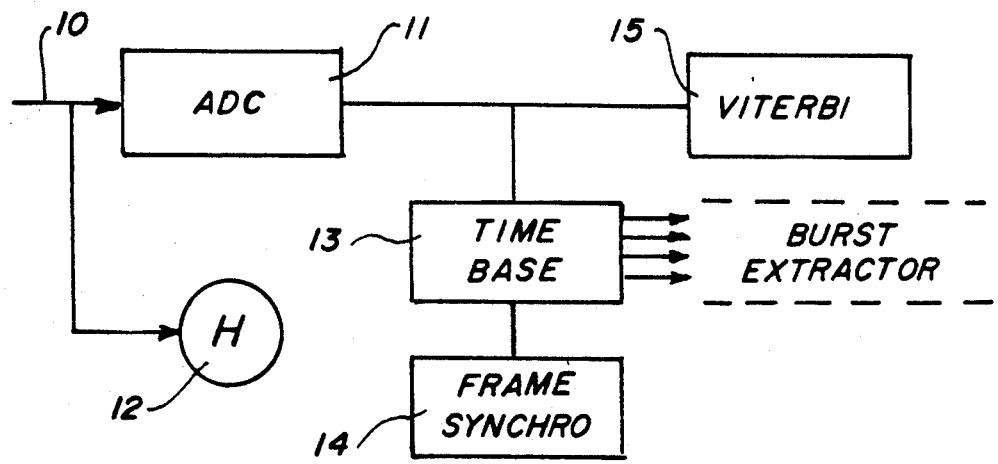
FIGS. 1, 2 and 3 are diagrams of the known circuits of the state of the art, commented on in the introduction.
Figure 2:
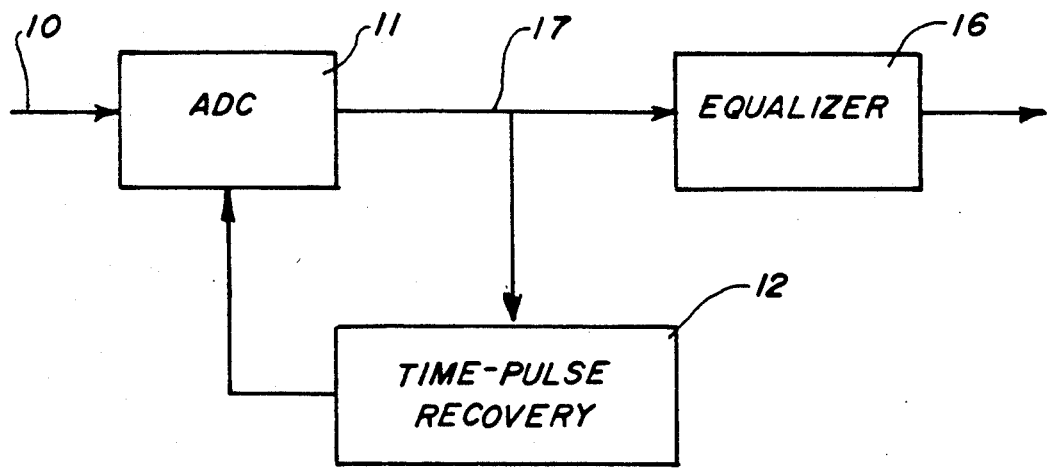
Figure 3:
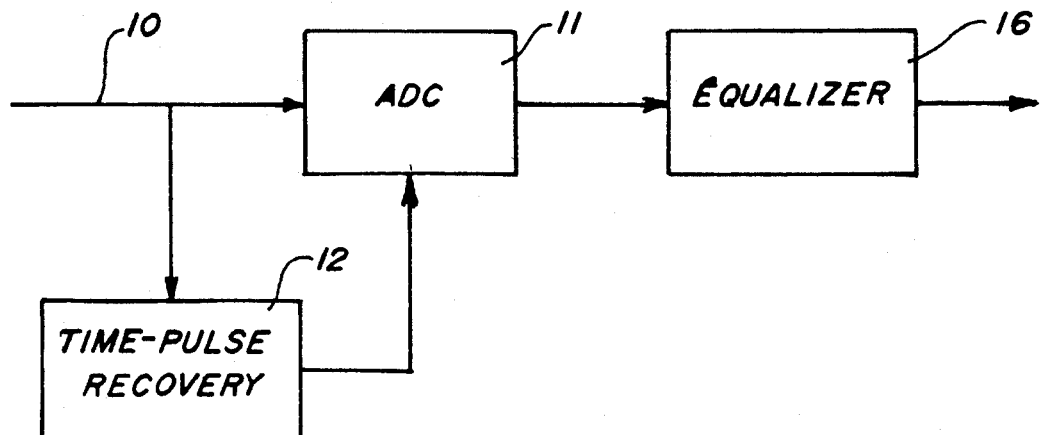
Figure 4:
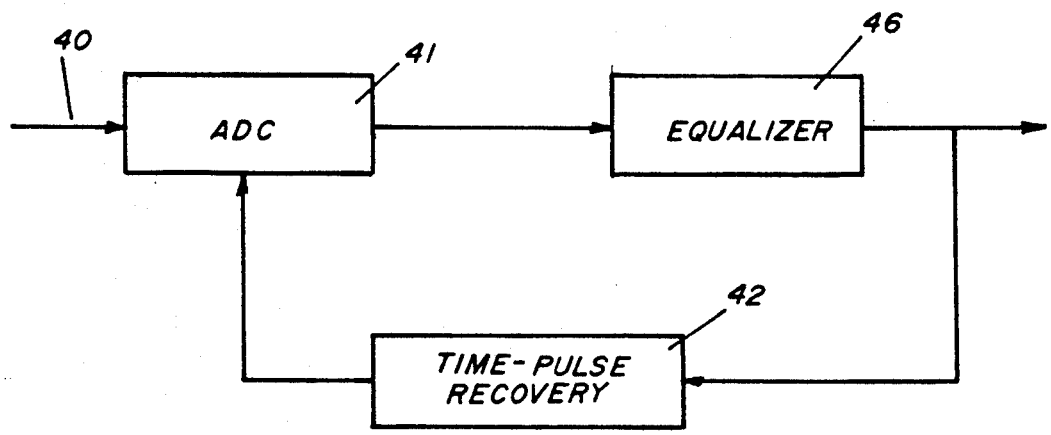
FIG. 4 is a diagram illustrating the general principle of timepulse recovery relooped at the outlet of the equalizer, of the device of the invention.

FIG. 4 is a diagram of the principle of relooping of the time-pulse recovery 42 at the output of the equalizer 46, so as to control the analog digital converter 41 that is to digitize the received signal 40. It is understood that this retroactive circuit makes it possible, under certain operating conditions, to benefit from the double advantage of effecting the time-pulse recovery on an equalized signal, and of optimizing the correction of the received signal by equalizing a signal that has been digitized on an optimized clock phase.

Figure 5:
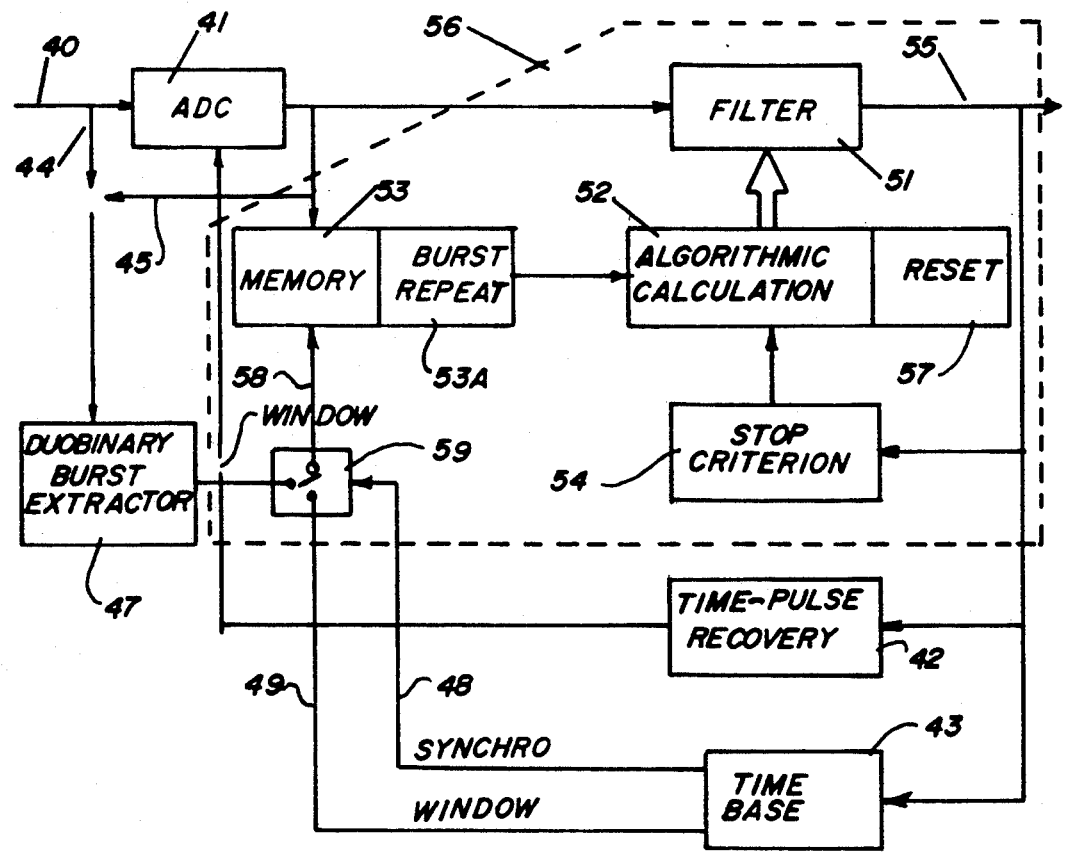
FIG. 5 is a diagram detailing, in the structure of FIG. 4, the essential constituent modules of the equalizer, in a preferred mode of embodiment of the device of the invention, a module of commutation either of an extractor of duobinary bursts, or of a time base of fenestration of the duobinary bursts, in the case of a received signal of the D2-MAC type.

As shown in FIG. 5, the input signal 40, after digitizing 41, on the one hand accesses a memory 53, and on the other hand passes through a digital filter 51. The memory 53 and the filter 51 belong to the same filter module 56 comprising in addition a module 52 for the calculation of filtering coefficients, and modules 54 and 57 for the stabilizing of the calculation of the coefficients, elaborating conditions for stopping the calculation.

The module 52 calculates, by using the data stored in the memory 53 and an algorithm described later, the coefficients of the filter 51. Equalizing is therefore effected in delayed mode, the signal continuing to pass into the filter 51 during the calculation of the coefficients.

The output data 55 of the filter 51 pass through a module 54, which calculates, based on criteria presented later, conditions of interruption of the calculation of new coefficients, when the current coefficients enable a satisfactory equalization to be obtained. As for the module 57, it provides Resetting of the coefficients of the filter 51 when a divergence of the positive has been found.

The output data 55 pass also through the time-pulse recovery module 42, which, owing to the preceding characteristics, make it possible to recover a stable clock.

The different modules of the device of FIG. 5 will now be covered in detail.

Figure 10:
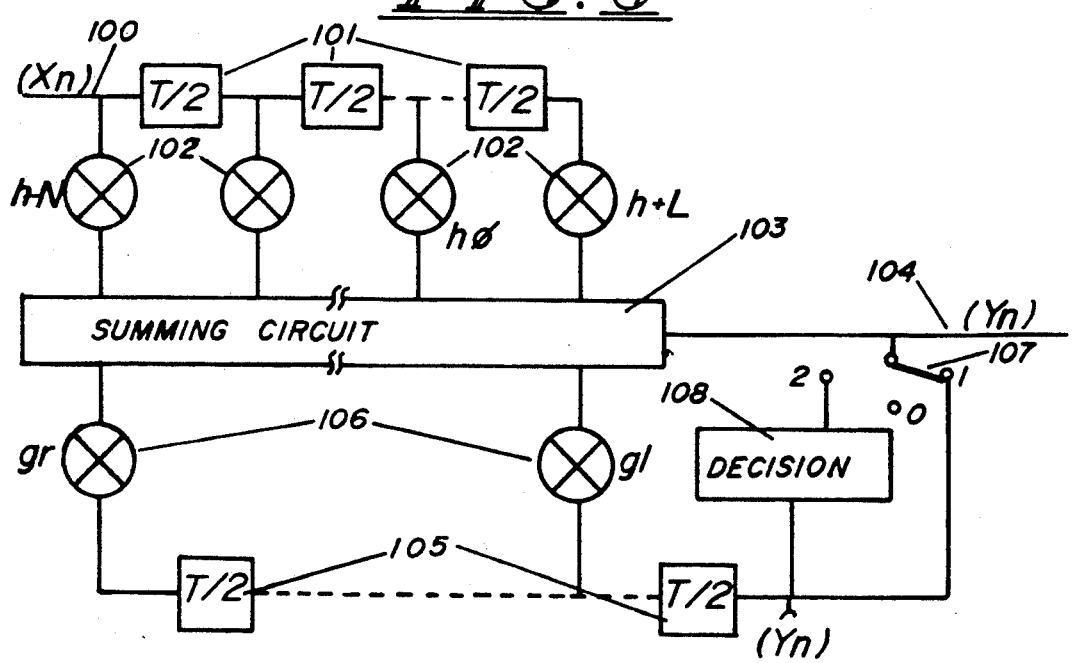
FIG. 10 is a block diagram of a known transverse filter of the state of the art, that can be used in the equalizer of the device of the invention.

The digital filter 51 is for example a transverse filter of the type shown in FIG. 10. The input signal 100 of the filter consists of a series of samples $x_n$. Each sample passes through a first chain of cells 101 mounted in series and each introducing a delay. This delay is for example equal to T/2, or the period corresponding to a sampling frequency double the bit frequency of the received signal. A set of $L+N+1$ multipliers 102 connects the chain of cells 101 to a summing circuit 103, where L is the number of samples received before a current sample h and N is the number of samples received after that current sample. The multiplication coefficients of the multipliers 102 are calculated by the algorithmic calculation module 52 of FIG. 5. The set of multipliers 102 has a central multiplier noted $h_0$. The filter is transparent when the central multiplier $h_0$ alone is activated (multiplication coefficient equal to 1), the other multipliers being at zero coefficient.

As an example, a prototype of the invention has been built, whose filter comprises multipliers 102 expressing multiplication coefficients in the +2 to −2 range approximately, expressed on 9 eb. The precision obtained in this manner on the output data of the filter enables the totality of the D2-MAC/Packet signal to pass in the filter, without any harmful effect on the analog components.

The output of the summing circuit 103 provides a filtered sampled signal $y_n$ 104. It feeds on the other hand a chain of cells 105 each contributing a delay, for example with a value T/2. The outputs of each of the cells 105 are connected to the summing circuit 103 through multipliers 106.

The switch 107 has three positions, 0, 1, 2, corresponding respectively to the embodiment of a direct linear transverse filter, to a recursive linear transverse filter and to a recursive non-linear transverse filter comprising a decision module 108 in the recursive loop of the chain of cells 105 and multipliers 106.

The device of the invention is compatible with different types of transverse filters, as well as other types of digital filters.

The coefficients of the multipliers $h_i$ and $g_i$ are calculated by the calculation module 52, as will be seen later.

At initialing the filter is transparent (i.e. the output signal is identical with the input signal), or a predetermined filtering function is performed (low-pass for example) until the calculated coefficients are received.

The system works best, in case of strong disturbances, when the filter is a linear filter. Indeed, the rate of error is much greater than $10^{-2}$ and the risk of propagation of errors, in a recursive structure with decision in the loop, takes on all its meaning.

Similarly, it is preferable to have the filter work at a frequency higher than that of the data in order to benefit from the improved phase recovery of this type of equalizing.

Within the framework of the D2-MAC/Packets application, the digital filter is advantageously a linear transverse filter (RIF, Pulse Response Finished) that works at twice the frequency of the data.

Details on the characteristics of the transverse filter can be found in the above-mentioned thesis.

The algorithmic calculation module 52 consists for example of a processor or a special automatic device that uses the data stored in the memory 53, and furnishes the filtering coefficients to the digital filter after calculation.

This calculation module can use any of the algorithms that permit minimizing a criterion of equalization, for example the average quadratic error EQM, expressed in the form:

$$EQM = E[(y_k - a_k)^2] \quad (1)$$

where E is the averaging function with:

$y_k$: symbol received
$a_k$: symbol transmitted

From this minimized value, the coefficients of the filter are calculated iteratively according to the formula:

$$H_{k+1} = H_k - \mu X_k e_k \quad (2)$$

with:

$h_k$, $H_{k+1}$: current vectors of the multiplication coefficients
$X_k$: vector of the current samples
$e_k$: filter output error
$\mu$: weighting factor ($\mu > 0$)

The convergence algorithm enabling the minimizing of the criterion to be obtained, i.e. in the case presented the minimizing of the average quadratic error, can be for example any type of algorithm of the gradient, and similar or derived ones.

Details and examples of these algorithms can be found in the above-mentioned thesis document, or also in the anterior French patent documents 83 17438 and 88 01641.

According to the invention, the calculation of the filtering coefficients is effected from sequences of simulation formed by using data stored in the memory 53.

These data are sampled in the digitized signal at the ADC 41 output. The memory cooperates with the means of control 58 of the writing of the digitized data, and of the reading of these data by the calculation module 52.

Storing in memory of the data corresponds to the principle of equalizing in delayed mode, characteristic of the invention, that offers in particular the following advantages:

it permits equalizing a signal whose high frequency prohibits any automation of the algorithm;
it solves the problems posed by the equalizing of signals of different nature multiplexed temporally (for example in the case of a D2-MAC signal), by enabling the calculation module to work only on the digital part of the multiplexed signal;
it permits forming besides sequences of simulation with stable clock phases, by the repetition of sampled and stored digital bursts.

This latter point is particularly important, and will be illustrated later, in connection with the description of the operation of the system in D2-MAC reception. The objective is indeed to obtain very long digital sequences to enable the algorithm used in the calculation module 52 to converge (several thousand iterations), without obtaining distortions of the clock phase in the digital sequence. Now, sampling directly the very long digital sequence in the received signal, or also by juxtaposition of several digital bursts (in the case of a type D2-MAC multiplex) risks to produce heterogeneities of the clock phase due to the distortions induced by the transmission channel. The repetition of a digital burst by burst repeater 53a sufficiently short to avoid phase distortion is an essential characteristic of the invention designed to overcome this problem.

In the case of a D2-MAC signal, the sampled digital burst corresponds for example to the digital part of a line signal.

FIG. 5 gives also details of an advantageous embodiment of the system of control of digital burst writing in the memory 53, in the case of a received signal with several components multiplexed temporally, of the D2-MAC type.

This write control system comprises a switch 59 connecting selectively to the control input 58 either a fenestration transmitted by a duobinary burst extractor 47, or a fenestration 49 originating in the time base 43 obtained from the filtered signal 55.

This system permits synchronizing duobinary bursts, in two stages, so that the limits of operation of the device of the invention are extended in the case of strong disturbances of the D2-MAC signal transmission channel.

The first stage consists of the duobinary burst extractor 47, which is fed either by the signal 40,44 in base band, or by the digitized signal 45.

The duobinary burst extractor is for example the one described in the French patent document 89 05978. The device described in that document uses a process of synchronizing extraction for a system of transmission with temporal multiplexing of digital signals and of analog signals, such as the D2-MAC signals. Its implementation comprises two successive phases, i.e. a phase of acquisition, then a phase of holding; these phases are effected in particular from the detection, in the received signal, of recursive data at line frequency with predetermined characteristics, until the recovery of the data burst framing window.

The duobinary burst extractor 47 permits a synchronizing recovery in the case of a strongly disturbed signal. Then, when the signal is correctly equalized, the clock is stable, the time base can be synchronized; the window enabling the duobinary bursts to be stored selectively can then be provided by the time base, through the control wire 49.

The switch 59 is for example a PAL, whose switching is effected by the wire 48 detecting the synchronizing of the time base 43.

The modules 54 and 57 correspond to stop conditions of the algorithmic calculation of the module 52. They enable the calculations to be stabilized, by avoiding especially the divergences of the equalizing process.

More specifically, the module 54 elaborates criteria of interruption of the calculation of new filtering coefficients, when the signal meets a certain criterion of satisfactory equalization. To this end, the module 54 is fed by the filtered signal 55; the activation of the interrupt function results either in the interruption of the renovating of the memory 53, or in the interruption of the loop of iterative calculations of the module 52, or also in the interruption of the renovating of the filtering coefficients furnished to the multiplication cells of the digital filter 51, or in any other equivalent means.

Several interrupt criteria can be used. A first criterion is that of the average quadratic error, when the convergence algorithm lowers its value below a threshold of predetermined sufficient minimizing.

It is also possible to use for example the error rate of the received signal as interrupt criterion.

In the case of a MAC Packets type application, another very simple interrupt criterion can be used: it is the criterion of code violation (transitions prohibited) of the duobinary signal (also called violation rate). In a first approximation, this criterion is equivalent to the error rate, but it offers the advantage of being obtainable by direct analysis of the received signal without complex calculations.

Other interrupt criteria can be used.

When the criterion exceeds a fixed limit, for example a rate of code violation or violation rate of $10^{-5}$, the algorithmic calculation is inhibited. The calculation resumes when the preceding condition is no longer met (case of a new disturbance).

The Reset module 57 enables a possible divergence of the algorithmic calculation module 52 to be detected, so as to reinitial the device. Such a situation of divergence can intervene for example when the data have a non-stable phase (phase jump during storage) or when the sample used as pertinent for the calculation of the output of the simulated filter is not the right one.

Two types of detection of divergences, different and complementary, can be given as examples:
limit values of the filtering coefficients: the coefficients are compared, either continuously, or at the end of the calculation, with limit values. When a coefficient exceeds a limit value, then all coefficients assume again their initialing values;
sum of the filtering coefficients: the operation is exactly the same by comparing this time the sum of the coefficients with a limit value.

This latter control is particularly important for preventing the hyperactivation of the filtration from resulting in a complete annulation of the signal, and therefore in a total impossibility to start a new loop of the calculation algorithm for converging. Further, in the case of the D2-MAC/Packets application, the annulation of the signal would interrupt the service by preventing the passage of the continuous components, necessary to perform in particular the GAG and clamp functions.

FIG. 5 includes finally a time-pulse recovery module 42. This can be any time-pulse recovery module, for example of the type working by the detection of the threshold crossings in the received signal (for ex. passages to zero and others). The expert will be able to identify by himself other processes of time-pulse recovery, depending on the received signal.

Now will be described the operation of the equalizing/time-pulse recovery device of the invention.

The table I gives the principal steps of the method of updating the filtering coefficients, by iterations, in the form of a flowchart.

The process includes the following steps:
initialing of the filter, i.e. initialing of the filtering coefficients so that the filter is transparent when the process is started;
after initialing of the algorithm, the data are written into memory, i.e. a duobinary burst is sampled in the received signal;
read-out of the memory is effected to feed the stored samples to the calculation module 52. In the case of a D2-MAC signal, 190 samples are stored in memory, which corresponds approximately to the length of a duobinary burst in a line signal.

The next iterative loop corresponds to the generation of the sequence of stimulation with stable clock phase, by the repetition by burst repeater 53a of the digital burst read in the memory 53, in order to effect the calculation of new filtering coefficients, using the following successive steps:
calculation of the Y output sample, at the filter output. Since, in the case of the D2-MAC signal, a sampling frequency double the bit frequency of the received signal has been chosen, only one sample out of two is calculated at the filter output;
calculation of the estimated value of the Y sample, for example by using a detector with threshold (ADS);
calculation of the error between the calculated sample and the estimated sample, in order to generate a new set of filtering coefficients $H_i$, according to the formula (2) presented earlier;
shifting of the samples in the simulated filter, using as value of the samples those of the stored digital burst. When the aggregate of the samples of the memory has been read a first time, the reading of the same samples is resumed again, this as much as necessary to obtain the number of iterations (several thousand) making it possible to obtain a calculation of relevant filtering coefficients.

The process includes then the two stop tests used in the modules 54 and 57, i.e.:
the divergence test, capable of causing Resetting of the process;
the interrupt test of the updating of the filtering coefficients, on the basis of one of the criteria mentioned earlier. When the interrupt criterion is checked, the process remains in observation of the filtered signal, without intervention on the coefficients of the filter until a new disturbance is detected bringing the value of the interrupt criterion below the interrupt threshold. At that instant, there occurs reinitialing of the algorithm, in order to obtain an iterative calculation of new filtering coefficients by a scan of the aggregate of the steps already described.

FIGS. 7A-7B, 8A-8B, 9A-9B are illustrations of three cases of operation of the process of the invention.

Case number 1 (FIGS. 7A, 7B): signal undisturbed

The filter is transparent at initialing. The samples contain no error, consequently, the calculated coefficients are identical with their initial values. The system is perfectly stable. Further, since the criterion is checked, the calculation of new coefficients is inhibited.

Figure 7A:
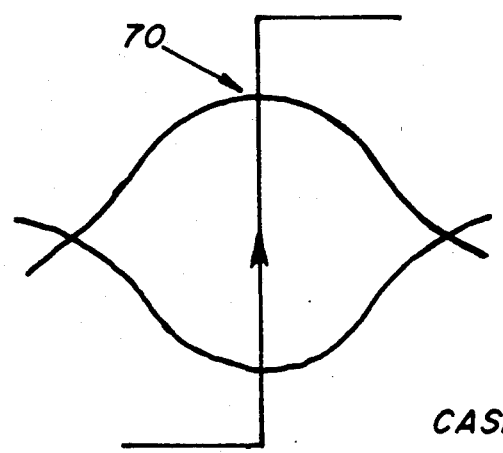
FIGS. 7A, 7B; 8A, 8B; 9A, 9B show the eye diagrams illustrating the operation of the equalization/time-pulse recovery device of the invention, depending on whether the recovered clock phase is or is not stable and/or optimum.
Figure 7B:
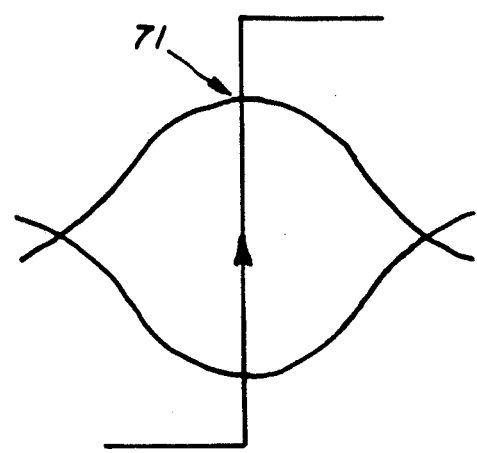

The eye diagram shown in FIGS. 7A, 7B shows therefore a stable centering of the sampling front 70 and 71, centered in the eye before and after the activation of the calculation module.

Case number 2 (FIGS. 8A, 8B): signal moderately disturbed

By moderately disturbed signal is to be understood a signal that permits synchronizing the time-pulse recovery (i.e. having a stable clock phase).

Like in the previous case, the clock phase is stable, but now, the interrupt criterion is, possibly, no longer respected.

If the interrupt criterion is not respected, the algorithmic calculation will take place until it is checked.

Figure 8A:
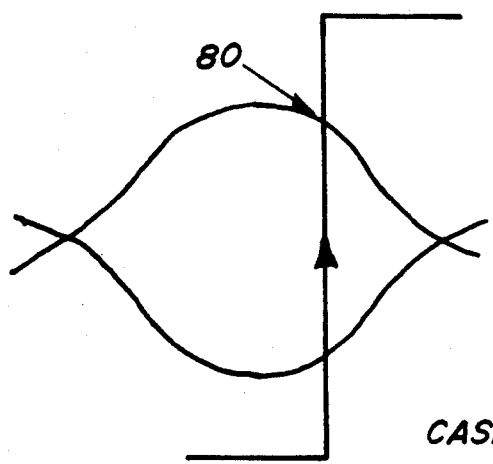
Figure 8B:
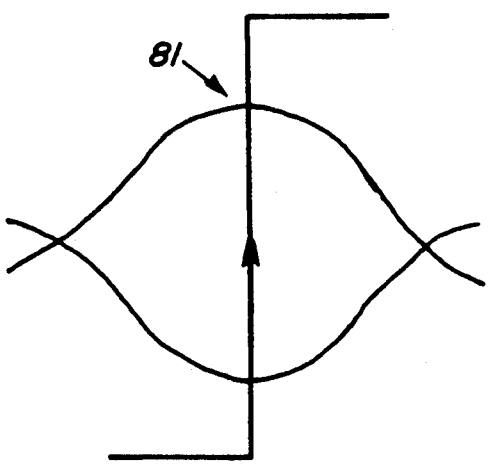

This is illustrated by the eye diagram of FIGS. 8A, 8B: prior to the activation of the calculation module, the sampling front 80 is offset in relation to the median of the eye (FIG. 8A). The convergence algorithm of the process permits a recentering of the front 81, by updating of the filtering coefficients.

Case number 3 (FIGS. 9A, 9B): signal strongly disturbed

It is at the reception of strongly disturbed signals that the system of the invention appears to furnish particularly high performance.

In the sense adopted here, the presence of strong disturbances on the transmission line results in an unstable clock, and therefore in a non-synchronized system (no service provided).

The structure of the device as shown in FIG. 5 permits then performing the following processes:
- synchronizing of a binary train, and storage of a duobinary burst in the storage module 53. This step is performed by using, if applicable, the duobinary burst extractor 47, then the fenestration signal 49 of the time base 43. The synchronizing principle by means of the duobinary burst extractor is of the type with successive attempts tolerating a failure. This is achieved through the Reset module 57, in the case of the detection of divergence of the algorithmic calculation module 52, as explained in detail earlier;
- a step of correction of the sampling phase of the received signal. This step is performed by the combined action of the equalizing filter 51 and of the time-pulse recovery module 42 relooped on the ADC 41. It uses the algorithmic process of the table I.

In this step, the device of the invention is particularly strong, since it permits correcting a certain number of phase instabilities. For example, the following instabilities:
- phase irregularities of the sampling clock of the received signal;
- residual phase drift;
- bad phase synchronizing, due to oversampling;
- time base falling out of synchronism.

Phase irregularities of the sampling clock of the received signal are essentially contended with by the fact that a sequence of simulation of a fixed phase is built, by repetitions of a burst containing a limited number of samples. As a consequence, even though the clock phase (generated by the timepulse recovery 42) drifts inside the burst, it will have deviated little during the sampling of the signal, and the algorithm will operate on stored data having a quasi stable phase.

Figure 9A:
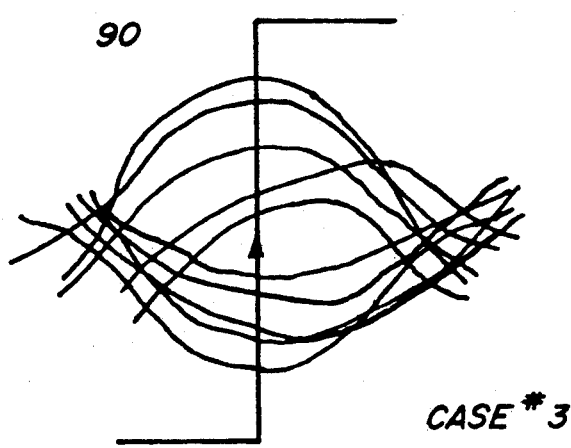
Figure 9B:
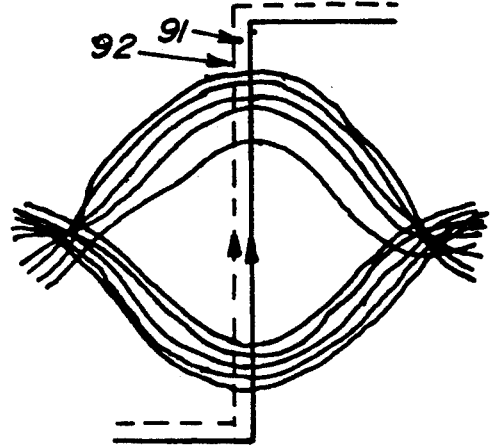

The problem of residual instability of the signal is illustrated in FIGS. 9A, 9B. The signal of FIG. 9A shows a slightly open eye, with a sampling front 90 offset in relation to the center of the eye. After a cycle of iterations of the algorithmic calculation module, the filtering coefficients transmitted to the filter 51 permit obtaining a better opening of the eye, with centering of the sampling front 91 in the eye. However, the fact that equalizing is effected imperfectly due to the high level of disturbance results in the phase of the received signal of the sampling clock, obtained with the equalized data, not coinciding exactly with the phase of the binary burst that served to update the filtering coefficients. The theoretical sampling front should therefore have been 92, not 91. This will cause a new calculation of the coefficients to try to put the data back in phase with this new clock phase 91. This will occur at each loop.

The distribution of each new clock phase in relation to the old and in relation to an optimum average value is not well known and is under study. But is is clear that a risk of divergence exists and that the stability of the entire system is not assured whatever the circumstances. For this reason, the interrupt criterion has been defined and, when this criterion is checked, the algorithmic calculation is inhibited, consequently the system does not correct the residual phase error and the entire system is perfectly stable.

Another cause of instability of the system can result from an impossibility to meet the interrupt criterion after convergence, in the case for example of a received signal with too much noise. The stability will then mean tracking in phase of the data in relation to the clock; the central filtering coefficient will tend to deviate from its initial position. Thus, in this case there will be a divergence, taken into account by the Reset module 47.

In the case of a system operating at a sampling being twice the data sampling frequency, all the samples at this double frequency are memorized.

One sample out of two is relevant for the calculation of the filter output. When the clock phase is stable, the position of the said sample is well known. When the clock phase is no longer stable, this position is not known. In this case there exists a risk of divergence. The control of the coefficients in the Reset module 57 enables this risk to be eliminated. The probability, when new storages are effected, that the chosen position, after the filter is put back in phase, corresponds to a relevant sample is greater than the probability of not finding the said correspondence, when the operating limits of the system are not exceeded.

Finally, in the case of out of synchronization of the time base 43, the switch 59 will be activated by the wire 48 indicating the out of synch condition of the time base 43, so that the duobinary burst extractor 47 will be activated.

It is ascertained therefore that the structure of the device of the invention makes it possible to prevent a blocking situation from occurring such as a loss of the signal or a divergence of the filtering coefficients, which renders the device extremely resistant to any situation of disturbance of the transmission channel.

Figure 6:
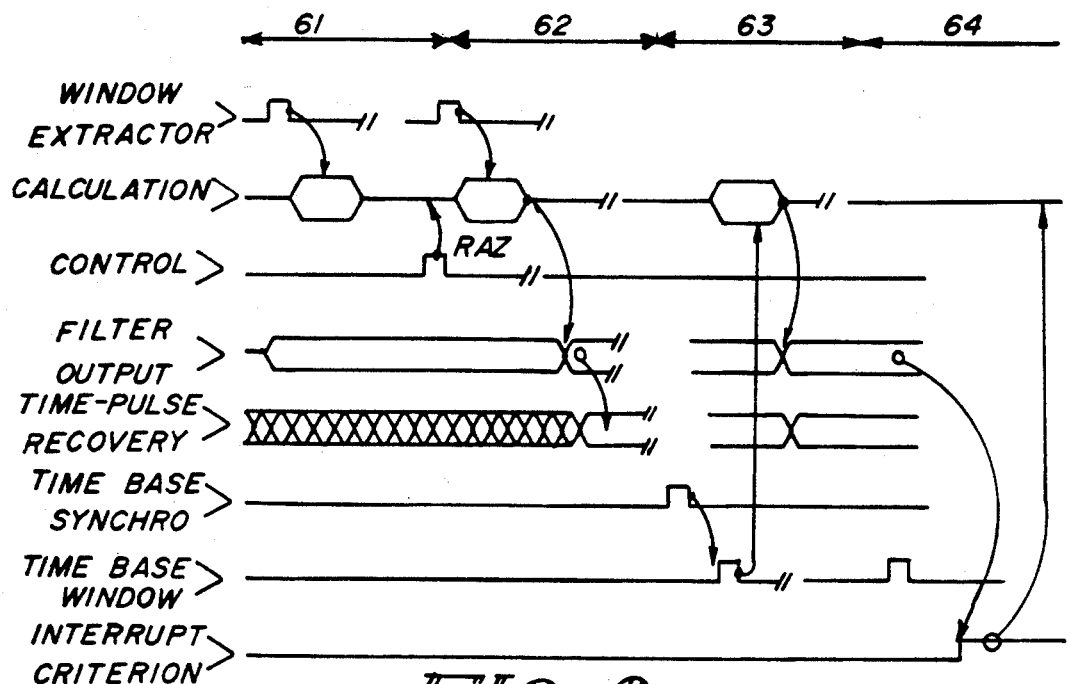
FIG. 6 is a chronogram showing the sequencing of the different steps of the iterative process of equalization and of time-pulse recovery according to the invention.

FIG. 6 is a chronogram illustrating a sequencing of the different modules of FIG. 5, in the case of an aborted attempt of signal extraction 61, then of a second successful attempt 62 resulting in updating the filtering coefficients 63, until the interrupt criterion of the calculation of new filtering coefficients is met 64.

TABLE I

Flowchart

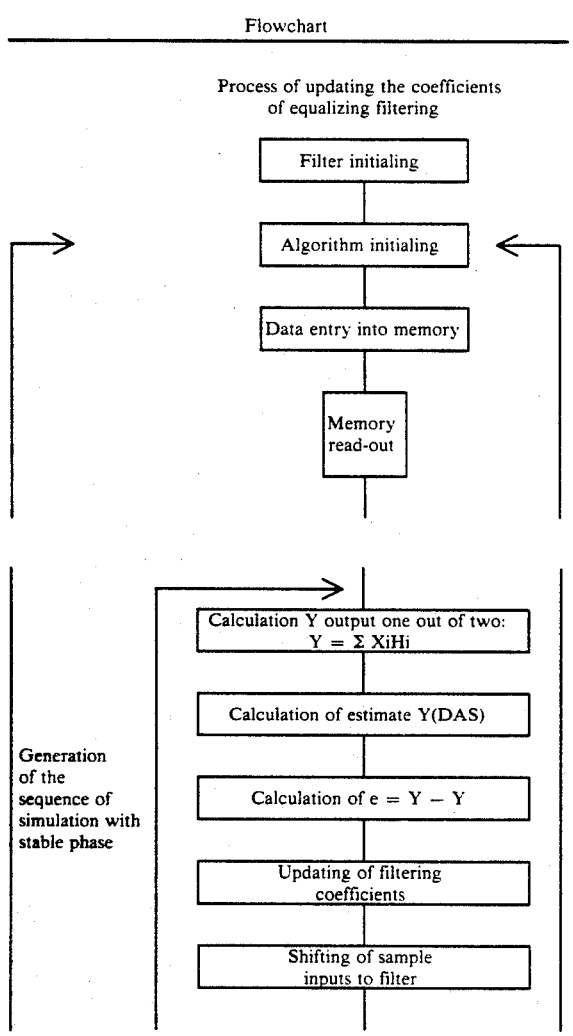

TABLE I-continued

Flowchart

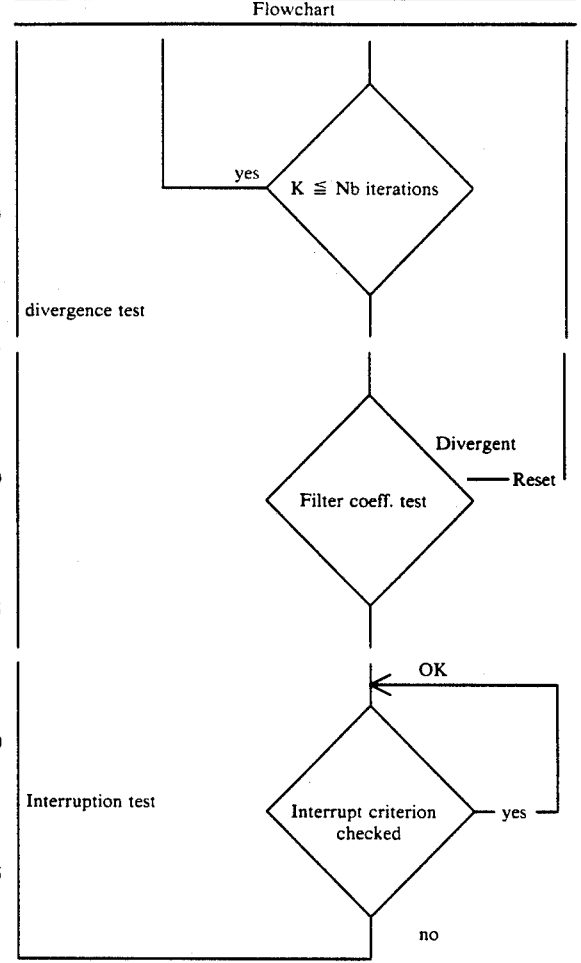

I claim:
1. A device particularly designed for use in a receiver of a received signal including data, the device comprising:
analog/digital converter means having an input and an output for digitizing the received signal;
a digital equalizer having an output, said equalizer being coupled to the output of said analog/digital converter means; and
a time-pulse recovery circuit coupled to the output of said digital equalizer for synchronizing said analog/digital converter means, wherein the digital equalizer comprises:
digital filter means for filtering the digitized received signal;
coefficient calculation means coupled to said digital filter means for calculating filtering coefficients from representative data of the received signal, said coefficients being adapted to control said digital filter;
means coupled to said analog/digital converter means for providing said data representative of the received signal to said coefficient calculation means including:
extractor means for extracting at least one digital burst sampled from the received signal;
storing means coupled to the extractor means for storing said digital burst;
means for supplying a signal consisting of said stored digital burst repeated at least two times to the coefficient calculation means; and
means for controlling the storing of a new burst of data in the means for storing after calculation of filtering coefficients from the supplying of the repeated digital burst of data.

* * * * *